(12) United States Patent
Books et al.

(10) Patent No.: US 11,691,605 B2
(45) Date of Patent: *Jul. 4, 2023

(54) ELECTRIC DRIVE VEHICLE WITH LOW SPEED CREEP

(71) Applicant: Cummins Inc., Columbus, IN (US)

(72) Inventors: Martin T. Books, Columbus, IN (US); Richard A. Booth, Columbus, IN (US); Jeffrey S. Rauch, Columbus, IN (US); Joseph E. Paquette, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/672,485

(22) Filed: Feb. 15, 2022

(65) Prior Publication Data

US 2022/0169219 A1    Jun. 2, 2022

Related U.S. Application Data

(63) Continuation of application No. 16/470,442, filed as application No. PCT/US2017/067554 on Dec. 20, 2017, now Pat. No. 11,273,811.

(Continued)

(51) Int. Cl.
*B60T 8/32*     (2006.01)
*B60L 15/20*    (2006.01)
(Continued)

(52) U.S. Cl.
CPC ........ *B60T 8/3255* (2013.01); *B60L 15/2009* (2013.01); *B60T 8/172* (2013.01);
(Continued)

(58) Field of Classification Search
CPC .......... B60T 8/3255; B60T 8/172; B60T 8/17; B60T 2220/04; B60L 15/2009;
(Continued)

(56) References Cited

U.S. PATENT DOCUMENTS 4,582,141 A    4/1986   van der Lely
5,446,351 A    8/1995   Kusano et al.
(Continued)

FOREIGN PATENT DOCUMENTS

DE    10 2009 033 953    2/2010
DE    10 2013 021 872    4/2014
(Continued)

OTHER PUBLICATIONS

International Search Report and Written Opinion for International Application No. PCT/US2017/067554, dated Mar. 9, 2018, 9 pages.
(Continued)

*Primary Examiner* — Russell Frejd
(74) *Attorney, Agent, or Firm* — Foley & Lardner LLP

(57) ABSTRACT

Systems and methods to control the vehicle speed of a vehicle includes a motor and a controller coupled to the motor. The controller is structured to: determine that a speed of a vehicle is at or above a predetermined speed limit; activate a motor speed governor responsive to an input received by the controller, wherein the motor speed governor is structured to control a vehicle speed; and adjust an output torque based on the vehicle speed being at or above the predetermined speed limit.

20 Claims, 9 Drawing Sheets

Related U.S. Application Data

(60) Provisional application No. 62/440,098, filed on Dec. 29, 2016.

(51) Int. Cl.
    *B60T 8/172*     (2006.01)
    *B60K 6/22*     (2007.10)

(52) U.S. Cl.
    CPC ............. *B60K 6/22* (2013.01); *B60L 2250/26* (2013.01); *B60T 2220/04* (2013.01); *B60Y 2200/91* (2013.01); *B60Y 2200/92* (2013.01)

(58) Field of Classification Search
    CPC ............. B60L 15/2063; B60L 2250/26; B60L 2240/12; B60L 2240/421; B60L 2240/423; B60K 6/22; B60Y 2200/91; B60Y 2200/92; B60W 2540/12; B60W 2540/16; B60W 30/146; B60W 30/18063; B60W 2710/083; B60W 2720/10; B60W 10/08; B60W 10/18; Y02T 10/62; Y02T 10/64; Y02T 10/72; Y02T 90/16
    See application file for complete search history.

(56) References Cited

U.S. PATENT DOCUMENTS

| | | |
|---|---|---|
| 8,043,194 B2 | 10/2011 | Soliman et al. |
| 8,315,752 B2 | 11/2012 | Kwon et al. |
| 8,536,809 B2 | 9/2013 | Kojima et al. |
| 8,634,987 B2 | 1/2014 | Seta et al. |
| 8,676,422 B2 | 3/2014 | Lee |
| 2012/0074767 A1 | 3/2012 | Nishio et al. |
| 2012/0150384 A1 | 6/2012 | Jung et al. |
| 2013/0053215 A1 | 2/2013 | Hou |
| 2013/0090799 A1 | 4/2013 | Nakamura et al. |
| 2013/0090800 A1 | 4/2013 | Nakamura et al. |
| 2013/0304336 A1 | 11/2013 | Jackson |
| 2015/0057898 A1 | 2/2015 | Marfatia et al. |
| 2015/0111693 A1 | 4/2015 | Wang et al. |

FOREIGN PATENT DOCUMENTS

| | | |
|---|---|---|
| JP | 2000-278815 A | 10/2000 |
| JP | 2013-215063 A | 10/2013 |

OTHER PUBLICATIONS

Extended European Search Report for European Application No. 17885529.2, dated May 11, 2020, 8 pages.

ELECTRIC DRIVE VEHICLE WITH LOW SPEED CREEP

CROSS-REFERENCE TO RELATED APPLICATIONS

This application is a continuation of U.S. patent application Ser. No. 16/470,442, filed Jun. 17, 2019 and now U.S. Pat. No. 11,273,811, which is a 35 U.S.C. § 371 national stage filing of PCT/US2017/067554, filed Dec. 20, 2017, which claims the benefit of and priority to U.S. Provisional Application No. 62/440,098, filed Dec. 29, 2016, all of which are hereby incorporated by reference in their entireties.

TECHNICAL FIELD

The present application relates generally to the field of vehicle speed systems. More particularly, the present application relates to systems and methods for controlling the vehicle speed for direct drive electric vehicles.

BACKGROUND

In general, a torque converter allows a vehicle equipped with an Automatic Transmission (AT) to seamlessly edge forward (or backward) from a full stop with little or no effort from the operator. Unlike the AT, a vehicle equipped with an Automated Manual Transmission (AMT) or a Manual Transmission (MT) is engaged with a clutch. When the engine of a vehicle that has an AMT or a MT is operating at its minimum idle speed, such vehicles experience clutch engagement issues that leave the vehicle moving faster than desired. To operate the vehicle at a slower desired speed requires the operator to allow the clutch to slip which decreases the life of the clutch. The engine may also be lugged back to sub-idle speeds to operate the vehicle at a slower desired speed, however, speed control may not be stable or the engine may stall.

A direct-drive electric vehicle is powered by the engagement of a motor and a battery without the need of an engine or transmission. The motor receives power from the energy stored in the direct-drive vehicle battery. In general, direct-drive electric vehicles are an efficient alternative to a vehicle, such as an AT, AMT, or MT, that utilizes gasoline or diesel power. Unlike the AMT and the MT, a direct-drive electric vehicle does not have a combined driveline clutch and minimum power plant speed that establishes a minimum vehicle speed. However, operating a direct-drive electric vehicle at very low speeds and loads is extremely inefficient. In a parking or other low speed maneuvering situation, it may be desirable to have precise control over the driveline torque.

Therefore, there exists a need to maneuver a direct-drive electric vehicle at low speeds that allow the vehicle to automatically move gradually when the brake is released. Having the ability to move gradually, for example to inch forward or backward when the brake pedal is released, advantageously provides the ability to drive and maneuver direct-drive electric vehicles with precision at low speeds.

SUMMARY

One implementation relates to a system. The system includes a motor and a brake mechanism structured to receive an indication of a desired change in vehicle speed. The system further includes a controller communicatively coupled to the motor and the brake mechanism. The controller is structured to receive the indication of the desired change in the vehicle speed, activate a motor speed governor responsive to the brake mechanism being in a released state, and adjust an output torque responsive to the vehicle speed, wherein as a load corresponding to the motor increases the vehicle speed decreases.

These and other features of the implementations described herein, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Below is a detailed description of various concepts related to, and implementations of, methods, apparatuses, and systems for controlling the vehicle speed of a vehicle. The various concepts introduced above and discussed in greater detail below may be implemented in any of numerous ways, as the described concepts are not limited to any particular manner of implementation. Examples of specific implementations and applications are provided primarily for illustrative purposes.

Referring to the Figures generally, the various embodiments disclosed herein relate to a system and method for controlling the vehicle speed (e.g., a low speed, such as the speed at which a vehicle creeps during a maneuver) of a vehicle (e.g., a direct-drive electric vehicle or hybrid vehicle). According to the present disclosure, a controller receives, via a brake mechanism of a direct-drive electric vehicle, an indication of a desired change in vehicle speed (e.g., whether the vehicle operator desires for a braking action to be applied), activates a motor speed governor structured to control the vehicle speed responsive to the brake mechanism in a released state, and adjusts, via the motor speed governor, an output torque responsive to the vehicle speed. As a load corresponding to the motor increases the vehicle speed decreases.

Figure 1:
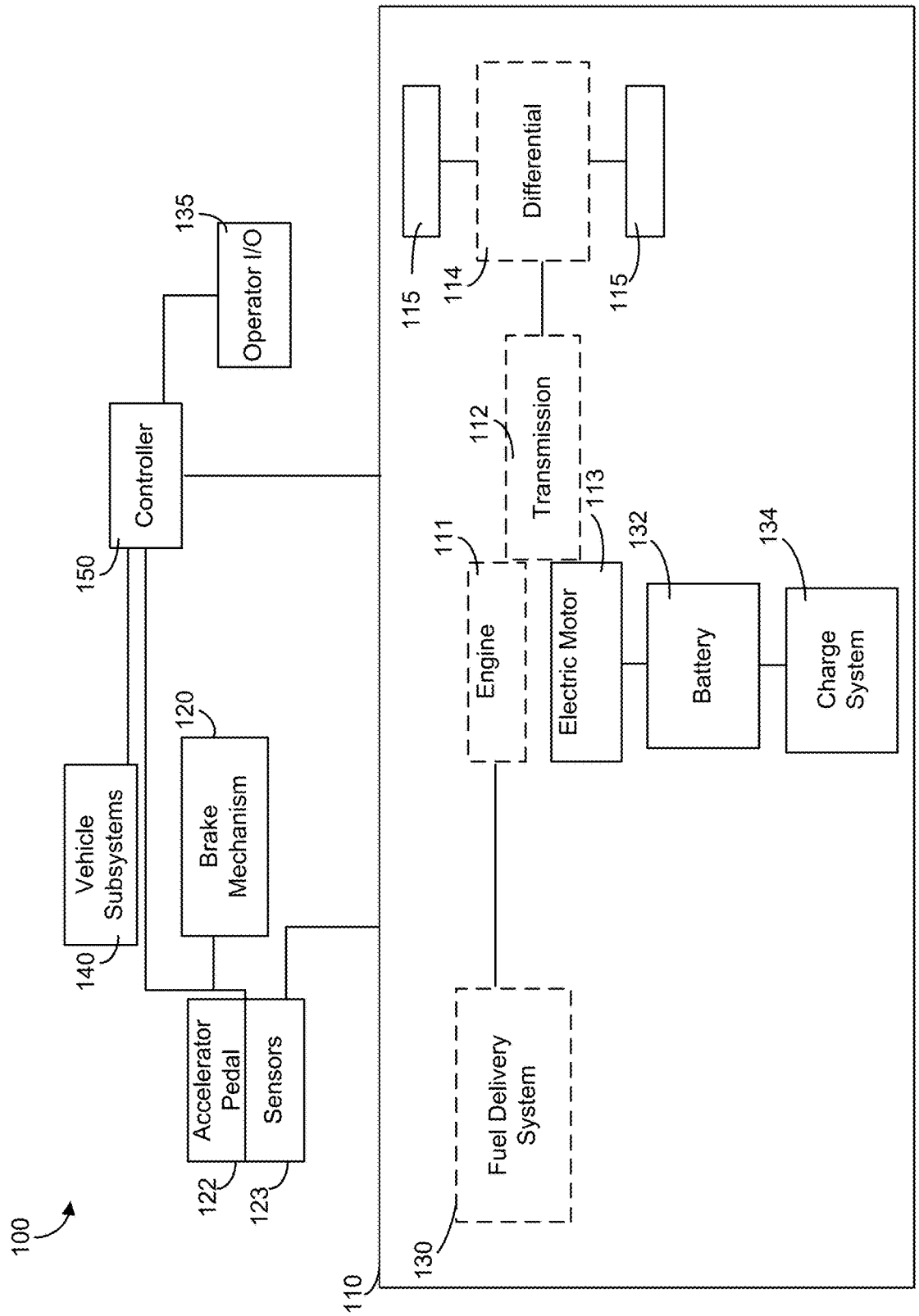
FIG. 1 is a schematic block diagram of an example vehicle having an example brake mechanism according to an example embodiment.

FIG. 1 depicts a schematic block diagram of an example vehicle 100 according to an example embodiment. The vehicle 100 may be a vehicle, such as a direct-drive electric vehicle or a hybrid vehicle, powered by or otherwise operable via a battery, generator (e.g., a power generator, generator plant, electric power strip, on-board rechargeable electricity storage system, etc.), a motor (e.g., an electric motor, traction motor, etc.), etc. The vehicle 100 may be operable in at least one of a reverse direction (e.g., a backward direction) and a non-reverse direction (e.g., a forward direction, angular direction, etc.). The vehicle 100 may be an on-road or off-road vehicle including, but not limited to, cars, trucks, ships, boats, vans, airplanes, spacecraft, or any other type of vehicle.

The vehicle 100 is shown to generally include a controller 150 communicably and operatively coupled to a brake mechanism 120 (e.g., a brake, braking system, or any other device configured to prevent or reduce motion by slowing or stopping components (e.g., a wheel, axle, pedal, etc. of a vehicle), powertrain system 110, an operator input/output (I/O) device 135, and one or more additional vehicle subsystems 140. It should be understood that the vehicle 100 may include additional, less, and/or different components/systems than depicted in FIG. 1, such that the principles, methods, systems, apparatuses, processes, and the like of the present disclosure are intended to be applicable with any other vehicle configuration. It should also be understood that the principles of the present disclosure should not be interpreted to be limited to on-highway vehicles; rather, the present disclosure contemplates that the principles may also be applied to a variety of other applications including, but not limited to, off-highway construction equipment, mining equipment, marine equipment, locomotive equipment, etc.

The powertrain system 110 facilitates power transfer from the motor 113 and/or the battery 132 to power the vehicle 100. In an example embodiment, the vehicle (e.g., a direct-drive electric vehicle and/or a hybrid vehicle) may be operable via a powertrain system 110 which includes a motor 113 operably coupled to a battery 132 and charge system 134, where the motor 113 transfers power to the final drive (shown as wheels 115) to propel the vehicle 100. As depicted, the powertrain system 110 includes various components that may be included in a direct-drive electric vehicle and/or a hybrid vehicle, such as for example, an engine 111 operably coupled to a transmission 112, a motor 113, and a differential 114, where the differential 114 transfers power output from the engine 111 to the final drive (shown as wheels 115) to propel the vehicle 100. As a brief overview and in this configuration, the controller 150 of the vehicle 100 (e.g., an electric vehicle) provides electricity to the motor 113 (e.g., an electric motor) in response to input received by the controller 150 from the accelerator pedal 122, charge system 134 (e.g., a battery charging system, rechargeable battery, etc.), etc. In some embodiments, the electricity provided to power the motor 113 may be provided by an onboard gasoline-engine generator, a hydrogen fuel cell, etc.

In some embodiments, the vehicle 100 may also include the engine 111 which may be structured as an internal combustion engine that receives a chemical energy input (e.g., a fuel such as natural gas, gasoline, ethanol, or diesel) from the fuel delivery system 130, and combusts the fuel to generate mechanical energy, in the form of a rotating crankshaft. The transmission 112 receives the rotating crankshaft and manipulates the speed of the crankshaft (e.g., the engine speed, which is usually expressed in revolutions-per-minute (RPM)) to effect a desired drive shaft speed. A rotating drive shaft may be received by a differential 114, which provides the rotation energy from the drive shaft to the final drive 115. The final drive 115 then propels or moves the vehicle 100. Further, the drive shaft may be structured as a one-piece, two-piece, and/or a slip-in-tube driveshaft based on the application.

In some examples, the vehicle 100 may include the transmission 112. The transmission 112 may be structured as any type of transmission, such as a continuous variable transmission, a manual transmission, an automatic transmission, an automatic-manual transmission, a dual clutch transmission, etc. Accordingly, as transmissions vary from geared to continuous configurations (e.g., continuous variable transmission), the transmission can include a variety of settings (e.g., gears, for a geared transmission) that affect different output speeds based on the engine speed. Like the engine 111 and the transmission 112, motor 113, differential 114, and final drive 115 may be structured in any configuration dependent on the application (e.g., the final drive 115 is structured as wheels in an automotive application and a propeller in an airplane application).

The vehicle 100 may include a throttle system (e.g., a throttle system including an intake manifold throttle) depending on the engine system utilized. The throttle system generally includes a throttle valve (e.g., a ball valve, a butterfly valve, a globe valve, or a plug valve), which in certain embodiments is operatively and communicably coupled to an accelerator pedal 122 and/or one or more sensors 123. The throttle valve is structured to selectively control the amount of intake air provided to the engine 111. Because the type of engine 111 may vary from application-to-application, the type of throttle valve may also vary with all such possibilities and configurations falling within the spirit and scope of the present disclosure. The term "throttle system" as used herein should be understood broadly, and may refer to any air management system, including without limitation an intake throttle, an exhaust throttle, and/or manipulations of an air handling device such as a turbocharger (e.g. a wastegate turbocharger and/or a variable geometry turbocharger). The throttle system may additionally or alternatively be active during stoichiometric-like operations of the engine, and inactive or less active during lean burn-like operations of the engine. The throttle system may be manipulated, in certain embodiments, in response to the engine speed, load, and/or substitution rate, independently and/or in conjunction with a signal from the accelerator pedal 122.

The accelerator pedal 122 may be structured as any type of torque and/or speed request device included with a system (e.g., a floor-based pedal, an acceleration lever, etc.). Further, the sensors 123 may include any type of sensors included with the brake mechanism 120, accelerator pedal 122, or any other component and/or system included in the powertrain system 110 of a vehicle. For example, the sensors 123 may include an accelerator pedal position sensor that acquires data indicative of a depression amount of the pedal (e.g., a potentiometer), a brake mechanism sensor that acquires data indicative of a depression amount of the brake mechanism 120 (e.g., a brake, brake pedal, etc.), a fuel temperature sensor, a charge air temperature sensor, a coolant temperature and pressure sensor, an ambient air temperature and pressure sensor, a fuel pressure sensor, an injection pump speed sensor, and the like.

As depicted, the vehicle 100 includes the operator I/O device 135. The operator I/O device 135 enables an operator of the vehicle to communicate with the vehicle 100 and the controller 150. Analogously, the I/O device 135 enables the vehicle or controller 150 to communicate with the operator. For example, the operator I/O device 135 may include, but is not limited, an interactive display (e.g., a touchscreen, etc.) having one or more buttons/input devices, haptic feedback devices, an accelerator pedal, a brake pedal, a shifter for the transmission, a cruise control input setting, a navigation input setting, etc. Via the I/O device 135, the controller 150 can also provide commands/instructions/information to the operator (or a passenger).

As also shown, the vehicle 100 includes one or more vehicle subsystems 140. The various vehicle subsystems 140 may generally include one or more sensors (e.g., a speed sensor, torque sensor, ambient pressure sensor, temperature sensor, etc.), as well as any subsystem that may be included with a vehicle. Accordingly, in an embodiment including a hybrid vehicle, the subsystems 140 may also include an exhaust aftertreatment system structured to reduce diesel exhaust emissions, such as a selective catalytic reduction catalyst, a diesel oxidation catalyst (DOC), a diesel particulate filter (DPF), a diesel exhaust fluid doser with a supply of diesel exhaust fluid, and a plurality of sensors for monitoring the exhaust aftertreatment system (e.g., a NOx sensor).

The controller 150 is communicably and operatively coupled to the powertrain system 110, brake mechanism 120, accelerator pedal 122, the operator I/O device 135, and the one or more vehicle subsystems 140. Communication between and among the components may be via any number of wired or wireless connections (e.g., any standard under IEEE 802, etc.). For example, a wired connection may include a serial cable, a fiber optic cable, an SAE J1939 bus, a CATS cable, or any other form of wired connection. In comparison, a wireless connection may include the Internet, Wi-Fi, Bluetooth, Zigbee, cellular, radio, etc. In one embodiment, a controller area network (CAN) bus including any number of wired and wireless connections provides the exchange of signals, information, and/or data. Because the controller 150 is communicably coupled to the systems and components in the vehicle 100 (e.g., a direct-drive electric vehicle, etc.) of FIG. 1, the controller 150 is structured to receive data (e.g., instructions, commands, signals, values, etc.) from one or more of the components shown in FIG. 1.

It should also be understood that other or additional operating parameters to control the vehicle speed may be used. For example, additional parameters may include motor speed, battery characteristics (e.g., battery voltage), characteristics of the fuel delivery system 130 (e.g., timing, quantity, rate, etc. of a hybrid vehicle), characteristics regarding the brake position/operation and so on.

Figure 2:
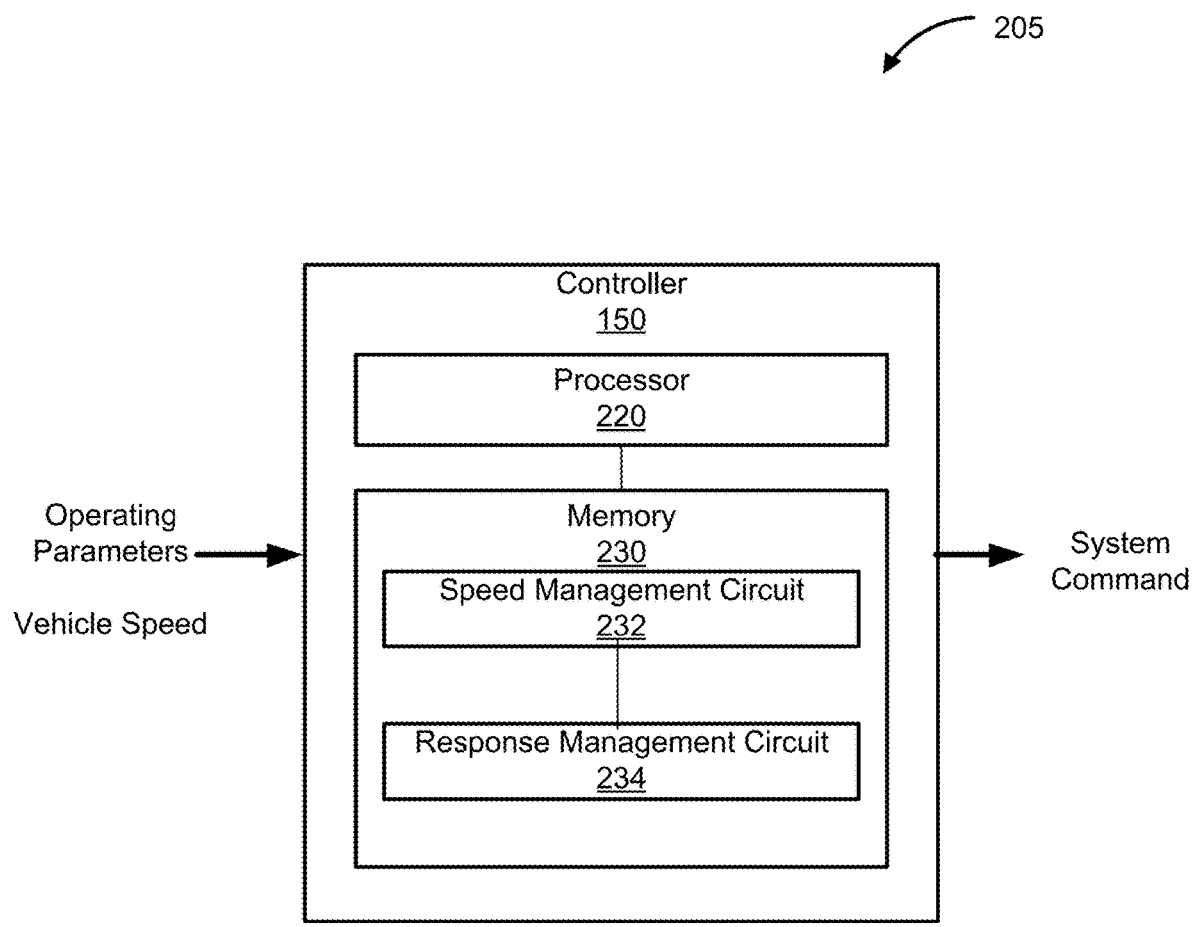
FIG. 2 is a schematic block diagram of a controller included in the vehicle of FIG. 1 according to an example embodiment.

The controller 150 includes a speed management circuit 232 as described herein with reference to FIG. 2. The speed management circuit 232 may be communicatively coupled to the powertrain system 110. Further, as the components of FIG. 1 are shown to be embodied in a vehicle 100 (e.g., a direct-drive electric vehicle), the controller 150 may be structured as, include, or be communicably and operatively coupled to at least one of a motor controller, powertrain system controller, etc. The function and structure of the controller 150 is described herein with reference to FIG. 2.

FIG. 2 is a schematic block diagram of a controller 150 included in a vehicle (e.g., the vehicle 100) according to an example embodiment. In the present embodiment, the controller 150 includes a processor 220, and a memory 230 or other computer readable medium. It should be understood that the controller 150 of FIG. 2 depicts only one embodiment of the controller 150, and any other controller capable of performing the operations described herein can be used. In some embodiments and as alluded to above, the controller 150 may take the form of at least one of a motor controller or a powertrain system controller.

The processor 220 can include a microprocessor, programmable logic controller (PLC) chip, an ASIC chip, or any other suitable processor. The processor 220 is in communication with the memory 230 and structured to execute instructions, algorithms, commands or otherwise programs stored in the memory 230.

The memory 230 includes any of the memory and/or storage components discussed herein. For example, the memory 230 may include RAM and/or cache of the processor 220. The memory 230 may also include one or more storage devices (e.g., hard drives, flash drives, computer readable media, etc.) either local or remote to the controller 150. The memory 230 is structured to store look up tables, algorithms, or instructions.

The speed management circuit 232 may be structured to receive, via a brake mechanism 120 of a vehicle 100 (e.g., a direct-drive electric vehicle), an indication of a desired change in vehicle speed. In some embodiments, the brake mechanism 120 may take the form of a brake, brake pedal, brake system, etc. The brake mechanism 120 may be structured to move or is otherwise operable between a depressed state and a released state. One or more sensors 123 (e.g., speed sensors) read, monitor, or otherwise record the speed of the rotation of the wheels 115 which provide an indication of a change in the vehicle speed. The vehicle speed may increase, decrease, or remain the same.

When the brake mechanism 120 is in the depressed state (e.g., the brake mechanism 120 is pressed or otherwise pushed), a force is applied such that the vehicle speed is adjusted (e.g., decreases) or the vehicle 100 is slowed to a stop. The vehicle speed may be adjusted in proportion to an application of the brake mechanism. For example, in the depressed state, the brake mechanism 120 applies a force which may cause engagement of a switch and/or friction between components of a brake system (e.g., the brake pads, brake rotors, etc.) such that the indication of the desired change in vehicle speed, for example a reduced vehicle speed, is read by the sensors 123. In some examples, the application of a force by the brake mechanism 120 in the depressed state may cause the motor 113 to enter a power generation state (e.g., the motor generates electricity which is provided to the battery 132). In the power generation state, the motor 113 causes the wheels 115 to slow which reduces the vehicle speed. In turn, the indication of the change in the vehicle speed is received by the speed management circuit 232.

Alternatively or additionally, the brake mechanism 120 may be in a released state. The brake mechanism 120 may enter the released state when the brake mechanism is released or when a force is no longer applied to the brake mechanism 120. For example, the brake mechanism 120 (e.g., the brake pedal) enters the released state when the brake pedal is released by the operator of the vehicle 100. In turn, the vehicle 100 begins to move or otherwise accelerate to a vehicle speed (e.g., a low speed) in a direction determined by a gear selection system (e.g., in a reverse direction or non-reverse direction).

The speed management circuit 232 may be structured to activate a motor speed governor (e.g., a speed limiter device) responsive to the brake mechanism 120 in the released state. As used herein, the term "motor speed governor" may be used to refer to a device, system, etc. structured to manage (e.g., control, limit, set, etc.) vehicle speed and/or output torque. In some embodiments, the motor speed governor may take the form of a proportional governor (e.g., a droop governor). The motor speed governor may be activated responsive to the brake mechanism 120 moving from a depressed state to a released state. In some embodiments, the speed management circuit 232 may be structured to determine whether the brake mechanism is in the released state. Alternatively or additionally, the speed management circuit 232 may be structured to activate the motor speed governor (e.g., a speed limiter device) responsive to an input received via the input/output device 135. For example, the activation of the motor speed governor may be associated with a gear selectable by an operator. The gear may be selectable via a gear selection system such as, but not limited to, a gear stick, gear shift, gear lever, an onboard diagnostic system (OBD), a display associated with the vehicle, vehicle dash, information system, etc. The gear once selected may cause the activation of the motor speed governor when desired by the operator of the vehicle 100.

The motor speed governor is operable between a first speed and a second speed. The first speed may include a speed rate of zero miles per hour (mph). The first speed may include a speed rate greater or less than zero miles per hour. The second speed may include a calibratable speed. The calibratable speed may correspond to a low speed between 0 and 2.5 miles per hour. In some embodiments, the motor speed governor may limit the vehicle speed such that when the vehicle speed increases or otherwise reaches a predetermined speed limit the vehicle speed may be prevented from increasing further. In this regard, one or more sensors 123 may detect the vehicle speed. The vehicle speed may be received by the motor speed governor. The motor speed governor may determine whether the vehicle speed has reached the predetermined speed limit. If the vehicle speed of, for example a direct-drive electric vehicle, reaches the predetermined speed limit, the speed management circuit 232 and/or the motor speed governor may prevent the direct-drive electric vehicle and/or hybrid vehicle from exceeding the predetermined speed. If the vehicle speed of, for example a hybrid vehicle, reaches or exceeds the predetermined speed, the speed management circuit 232 may limit the flow of air and/or fuel to the engine 111 that causes combustion to, thereby, limit the vehicle speed.

When the brake mechanism 120 is in the depressed state, for example, the brake pedal may be continuously applied which may decrease the vehicle speed causing the vehicle speed to go to zero miles per hour. When the brake mechanism 120 is released (e.g., moves from the depressed state to the released state), the motor speed governor may gradually (e.g., slowly) ramp up or otherwise increase the vehicle speed from the first speed to a calibratable speed (e.g., the second speed such as a nominal speed between 0 and 2.5 miles per hour). Alternatively or additionally, if the brake mechanism 120 and the accelerator pedal 122 are released, the motor speed governor gradually (e.g., slowly) ramps up or otherwise increases from the first speed to the calibratable speed (e.g., the second speed). Although the above example includes a nominal speed between 0 and 2.5 miles per hour, the example is understood not to limit the scope of vehicle speeds that may be achieved in various embodiments.

The controller 150 further includes the response management circuit 234. The response management circuit 234 may be structured to adjust, via the motor speed governor, an output torque responsive to the vehicle speed. The term "output torque" as used herein may refer to the amount of force the motor outputs or otherwise provides. The output torque may be increased responsive to an adjustment of the vehicle speed. The motor speed governor senses the decrease in the vehicle speed (e.g., the decrease in revolutions-per-minute (RPM)) due to the application of the brake mechanism 120 that works against the power of the motor 113. In turn, the motor speed governor increases the output torque to counteract the decrease in the vehicle speed and/or to maintain the vehicle speed. Further description of the motor 113 and the increased output torque is described herein below with reference to FIGS. 3-8.

The powertrain system 110 eventually reaches an equilibrium at an increased load and a lower vehicle speed as the output torque increases when the brake mechanism 120 is continuously applied. For example, when a load corresponding to the motor 113 increases, the vehicle speed decreases (e.g., the RPM decreases). The load may increase due to the vehicle 100 being on an inclined road such that an increased output torque is required to maintain speed. The load may increase because the operator is applying a variable amount of force to the brake mechanism 120 such that the motor 113 increases the output torque to overcome the drag of the brakes. In some embodiments, the vehicle speed is adjusted in proportion to the load increase. Accordingly, the motor speed governor may include the droop governor as described above such that as the load increases, the vehicle speed decreases proportionally. Alternatively or additionally, the increased output torque decreases the vehicle speed according to a governed speed droop line (e.g., a speed droop line slope) as described in FIGS. 4-8.

In some embodiments, the response management circuit 234 may be structured to generate a command (e.g., a code) structured to cause the motor speed governor to control the vehicle speed between the first speed and the second speed. In some embodiments, the response management circuit 234 may be structured to generate a plurality of commands. In this regard, the command communicates operating parameters to the powertrain system 110 to actuate various components, circuits, or levers of the powertrain system 110 to cause the vehicle 100 to move or otherwise operate between the first speed and the second speed (e.g., a nominal speed between 0 and 2.5 miles per hour) such that the vehicle 100 automatically moves (e.g., gradually moves forward or backward, gradually reduces speed to zero, inches forward or backward, edges forward or backward, creeps, etc.) in a reverse direction and/or a non-reverse direction.

In further embodiments, the response management circuit 234 may be structured to deactivate the motor speed governor responsive to at least one of the vehicle speed comprising a speed rate of zero miles per hour or receiving an indication of a desired change in vehicle acceleration. For example, if the application of the brake mechanism 120 causes the vehicle speed to decrease to zero miles per hour, the response management circuit 234 may deactivate the motor speed governor. If the application of the accelerator pedal 122 indicates a desired change in vehicle acceleration (e.g., depressing the accelerator pedal 122 causes the vehicle speed to increase), the response management circuit 234 may deactivate the motor speed governor. The response management circuit 234 may be structured to deactivate the motor speed governor responsive to at least one of the vehicle speed comprising a speed rate of zero miles per hour or receiving an indication of a desired change in vehicle acceleration.

Figure 3:
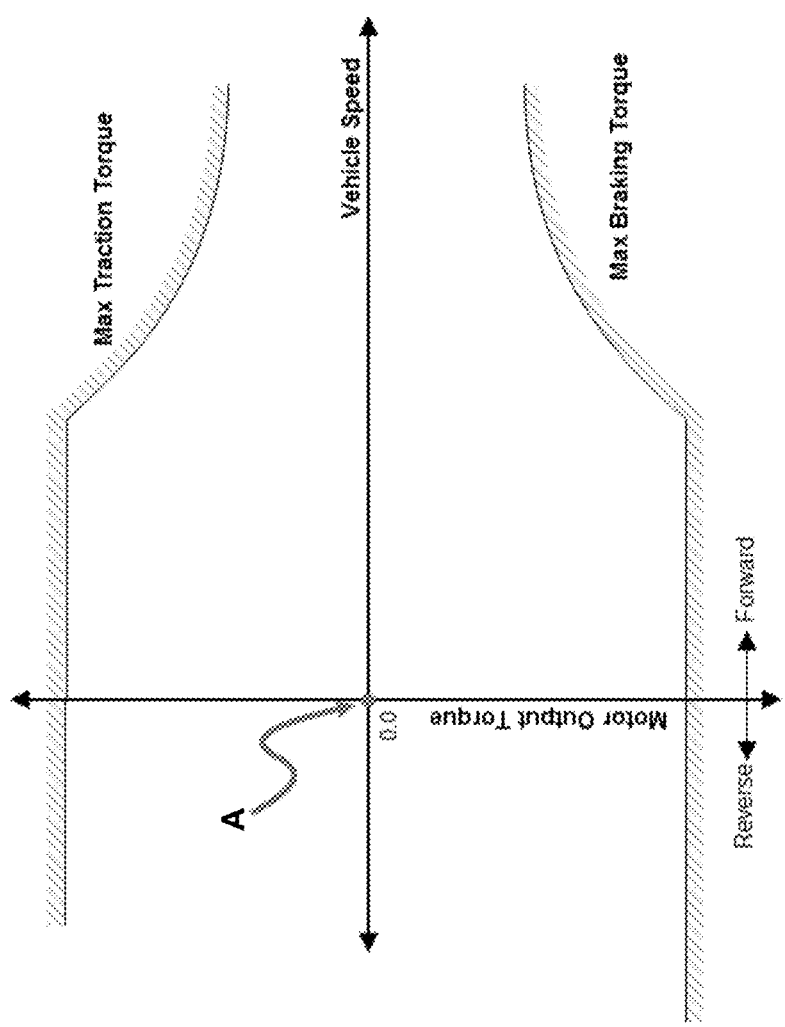
FIG. 3 is a diagram of the vehicle speed set to zero miles per hour according to some embodiments.
Figure 4:
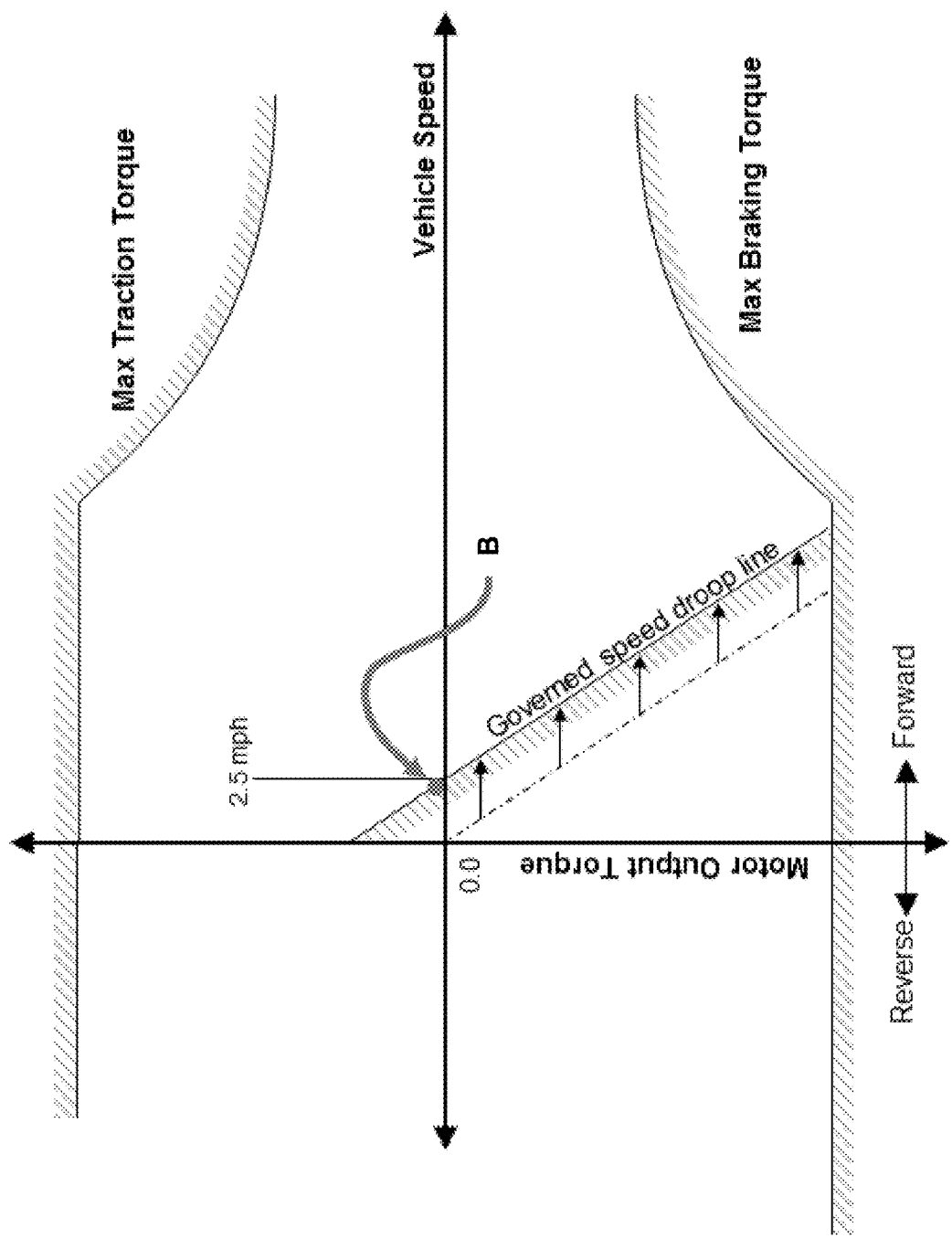
FIG. 4 is a diagram of the vehicle speed and output torque in a non-reverse direction according to some embodiments.

FIGS. 3-8 illustrate the control of the vehicle speed according to various embodiments. As illustrated in FIG. 3 at A, initially the vehicle speed is set to zero miles per hour. In this example, the brake mechanism (e.g., the brake pedal) may be applied which, thereby, causes the brake mechanism to operate in a depressed state as described herein above. In FIG. 4 which illustrates the vehicle speed and output torque in a non-reverse direction, the accelerator pedal is not depressed and the output torque is set to zero. The vehicle speed increases to a calibratable speed rate of, for example, 0.5 miles per hour per second. When the vehicle speed increases or otherwise reaches a second speed of 2.5 miles per hour, the vehicle speed, which is controlled via the motor speed governor, may stop increasing. As illustrated at B when the vehicle speed increases, the motor speed governor increases the output torque such that the vehicle speed behaves according to the governed speed droop line. In turn, the increased output torque which counteracts the vehicle speed increase causes the vehicle speed to decrease.

Figure 5:
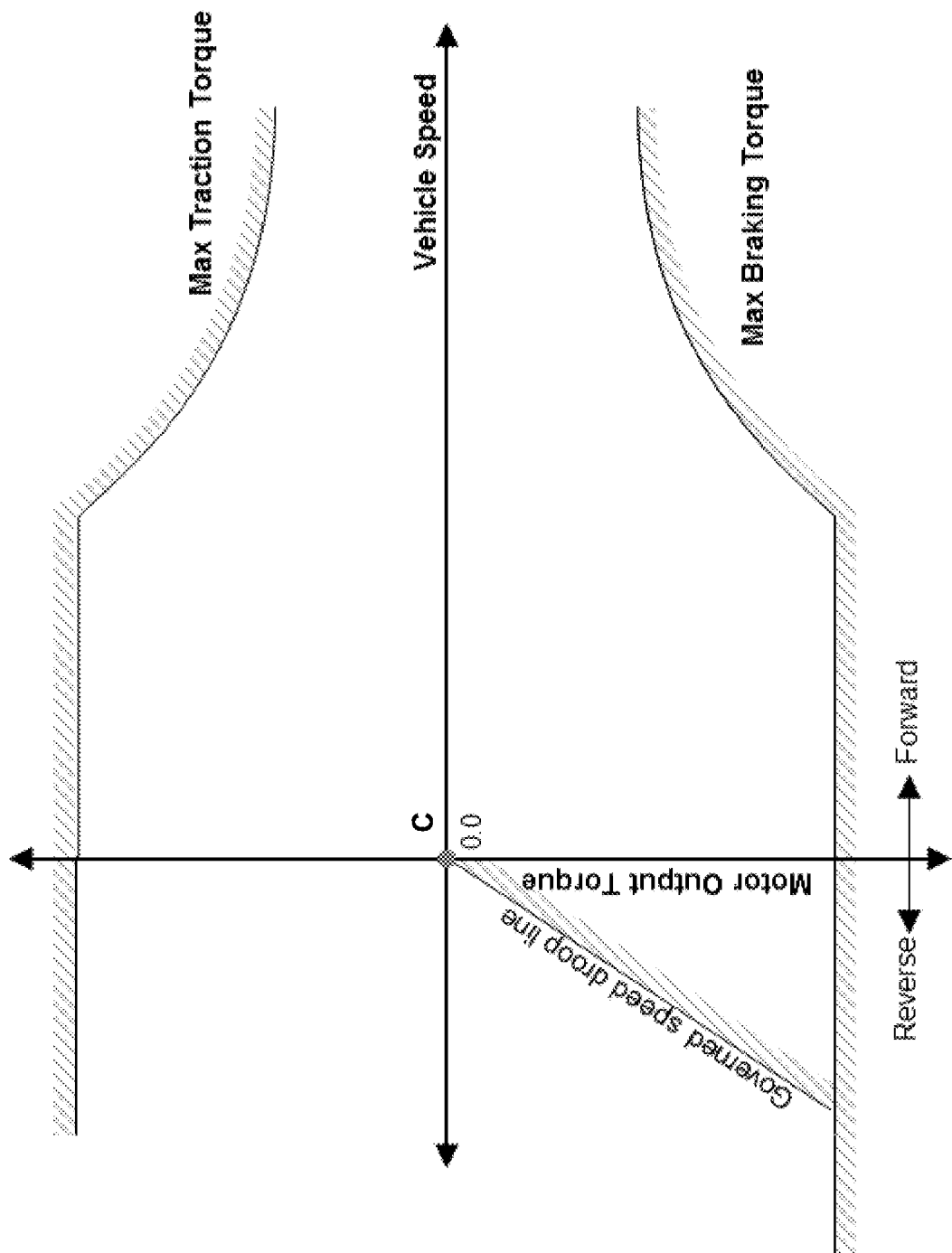
FIG. 5 is a diagram of the vehicle speed and output torque in a reverse direction according to some embodiments.
Figure 6:
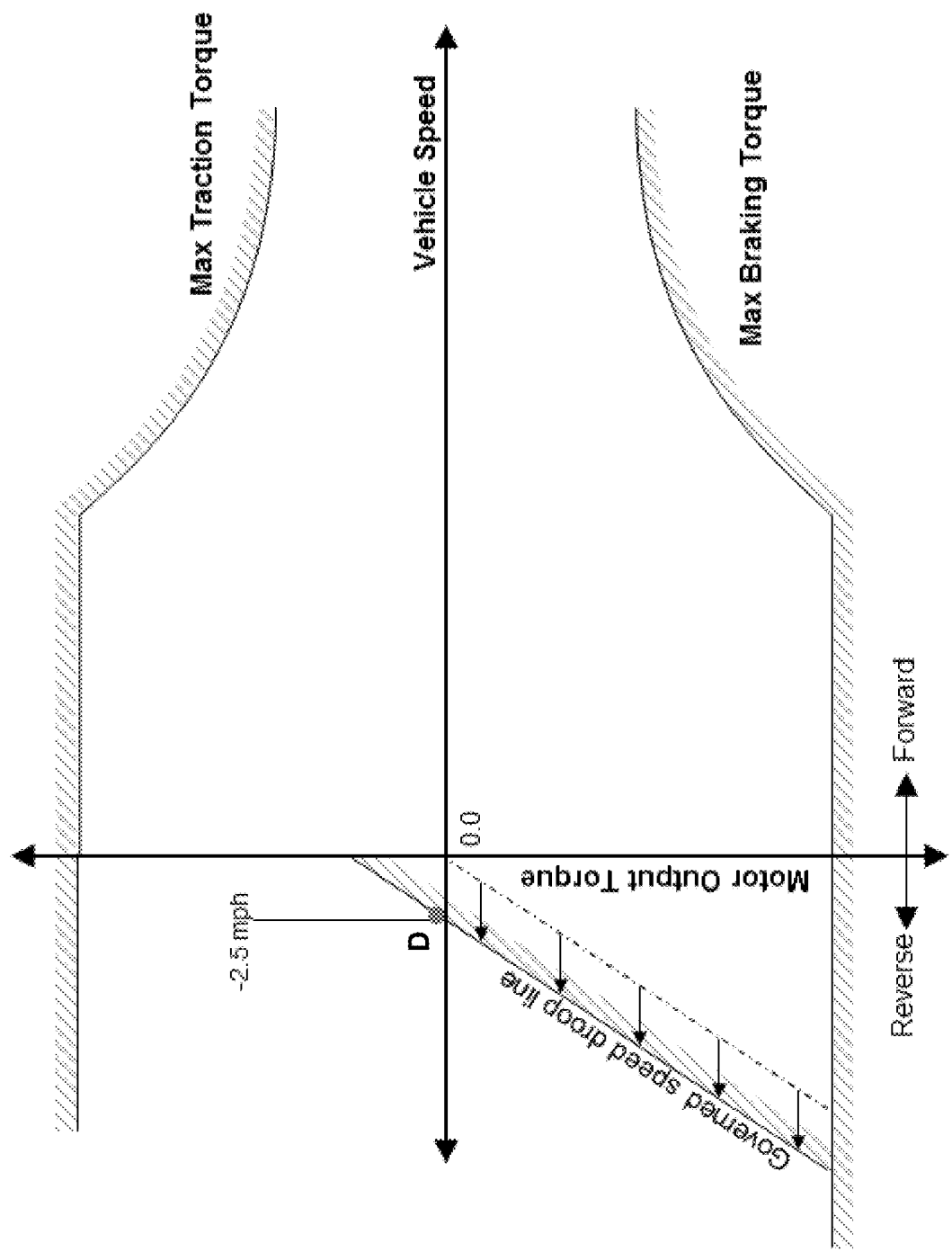
FIG. 6 is a diagram of the vehicle speed and output torque in a reverse direction according to some embodiments.

FIGS. 5-6 illustrate the vehicle speed and output torque in a reverse direction according to some embodiments. In this example, the brake mechanism may not be applied such that the brake mechanism operates in a released state as described herein above. The motor speed governor is activated with a vehicle speed set to zero miles per hour at C. The vehicle speed decreases to a calibratable rate of, for example, −0.5 miles per hour per second due to the reversed direction of the vehicle. The vehicle speed, which is controlled via the motor speed governor, stops decreasing when the vehicle speed decreases or otherwise reaches a second speed of −2.5 miles per hour as shown in FIG. 6 at D.

Figure 7:
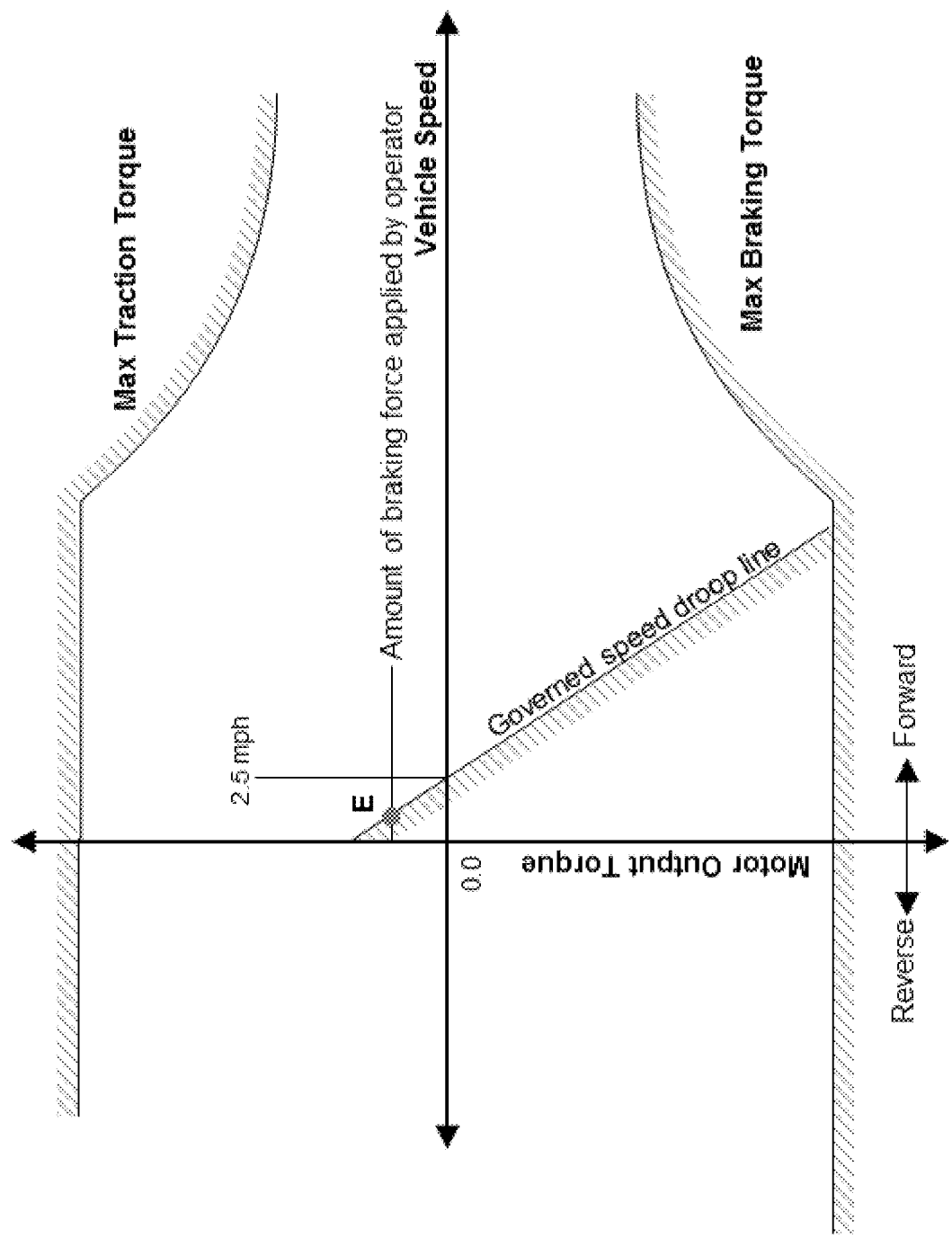
FIG. 7 is a diagram of the vehicle speed and output torque in a non-reverse direction according to some embodiments.

FIG. 7 illustrates the vehicle speed and output torque in a non-reverse direction. The brake mechanism may be applied which causes the brake mechanism to operate in a depressed state. The motor increases the output torque to maintain the vehicle speed against the increased force applied to the brake mechanism. As the output torque increases, the vehicle speed decreases proportionally along the governed speed droop line. The vehicle speed and load may reach equilibrium dependent on the application of the brakes mechanism by the operator at E. With enough braking force, the output torque may be increased to counter the application of the brake mechanism. The vehicle speed may decrease (e.g., droop) to zero miles per hour which deactivates the motor speed governor.

Figure 8:
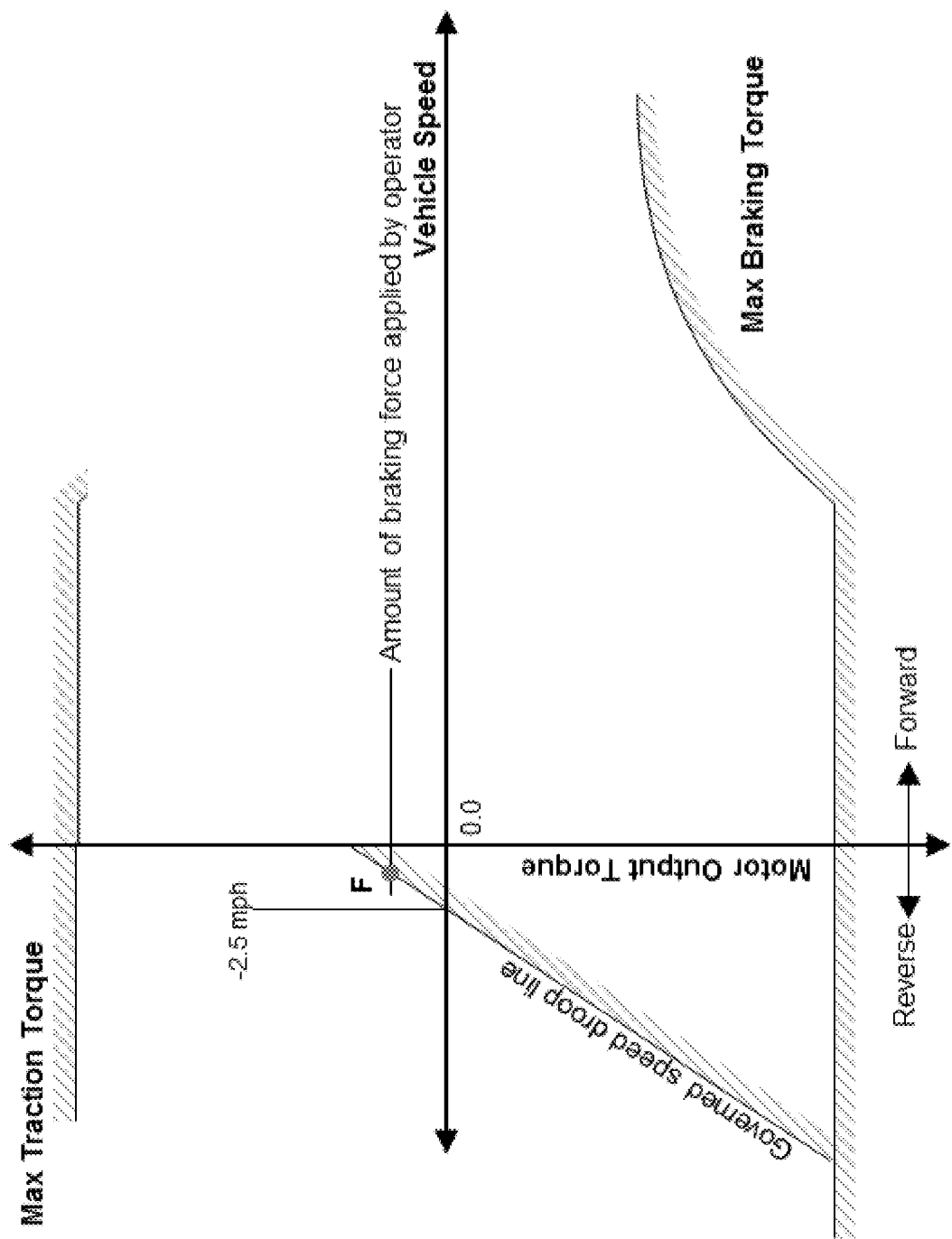
FIG. 8 is a diagram of the vehicle speed and output torque in a reverse direction according to some embodiments.

In the example embodiment of FIG. 8 which illustrates the vehicle speed and output torque in a reverse direction, the brake mechanism may be applied to cause the brake mechanism to operate in a depressed state. The motor increases the output torque to maintain the vehicle speed against the application of the brake mechanism. As the output torque increases, the vehicle speed increases proportionally along the governed speed droop line. The vehicle speed and load may reach equilibrium dependent on the application of force to the brakes mechanism by the operator at F.

Figure 9:
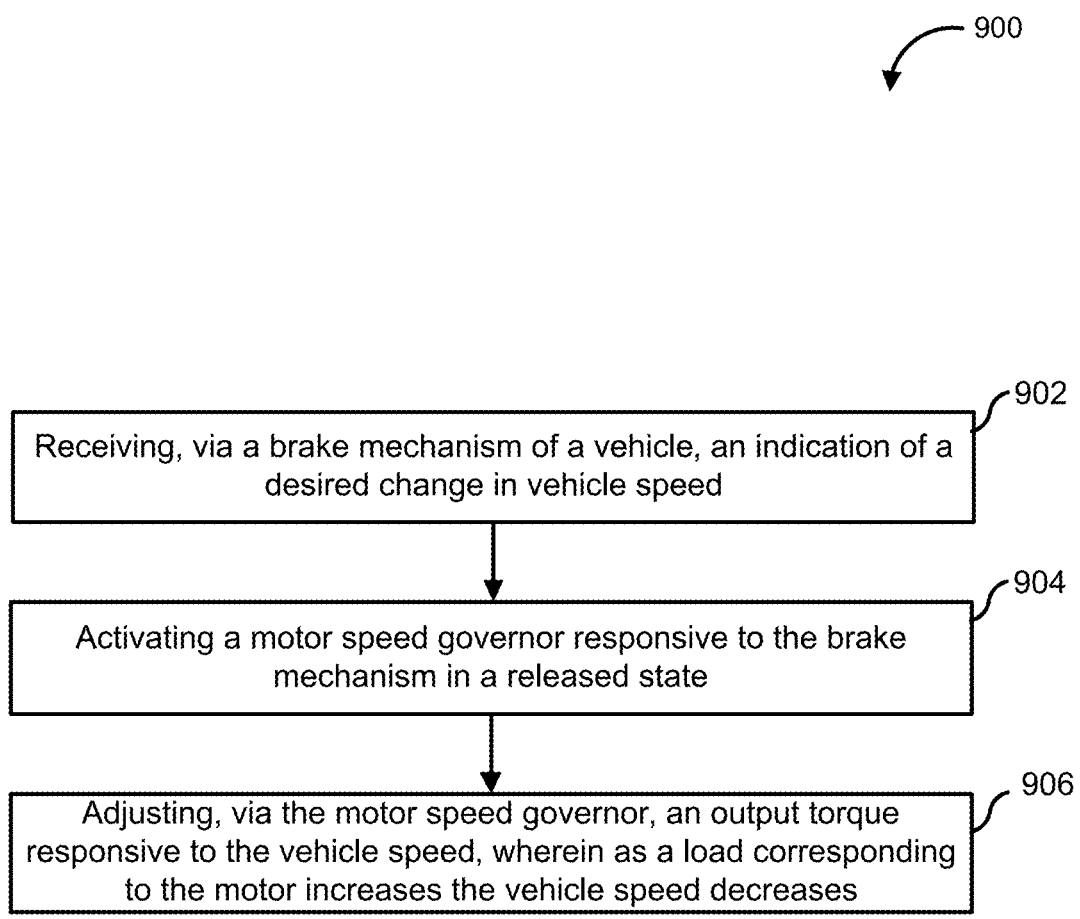
FIG. 9 is a schematic flow diagram of an example method of controlling the vehicle speed of a vehicle.

FIG. 9 is a flow diagram of an example process 900 for a controller to control the vehicle speed of a vehicle (e.g., a direct-drive electric vehicle or hybrid vehicle) via the circuits described herein with reference to FIG. 2. At 902, the process 900 includes receiving, via a brake mechanism communicatively coupled to a motor of a vehicle, an indication of a desired change in vehicle speed. For example, an indication of a change in vehicle speed is received when a brake mechanism is applied such that the vehicle speed decreases or slows to a stop.

At 904, a motor speed governor (e.g., a speed limiter device) structured to control the vehicle speed may be activated by a controller. The motor speed governor may be activated responsive to the brake mechanism moving from a depressed state to a released state. As the brake mechanism is released (e.g., moves from the depressed state to the released state), the motor speed governor may gradually (e.g., slowly) ramp up or otherwise increase the vehicle speed from a first speed to a second speed (e.g., a nominal speed between 0 and 2.5 miles per hour).

At 906, an output torque is adjusted by a controller responsive to the vehicle speed. As the brake mechanism is applied, the application of the brake mechanism works against the power of the motor. In order to counteract the application of the brake mechanism, the motor increases the output torque via the motor speed governor. When a load corresponding to the motor increases, the vehicle speed decreases. In turn, the vehicle speed is adjusted in proportion to the load increase such that while operating between the first speed and the second speed, the vehicle 100 automatically moves gradually forward or backward, inches forward or backward, edges forward or backward, etc.

The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Many of the functional units described in this specification have been labeled as circuits, in order to more particularly emphasize their implementation independence. For example, a circuit may be implemented as a hardware circuit comprising custom VLSI circuits or gate arrays, off-the-shelf semiconductors such as logic chips, transistors, or other discrete components. A circuit may also be implemented in programmable hardware devices such as field programmable gate arrays, programmable array logic, programmable logic devices or the like.

Circuits may also be implemented in machine-readable medium for execution by various types of processors. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit.

Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network. Where a circuit or portions of a circuit are implemented in machine-readable medium (or computer-readable medium), the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone computer-readable package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope. No claim element herein is to be construed under the provisions of 35 U.S.C. § 112, sixth paragraph, unless the element is expressly recited using the phrase "means for."

What is claimed is:

1. A system, comprising:
   a motor; and
   a controller coupled to the motor, the controller structured to:
      determine that a speed of a vehicle is at or above a predetermined speed limit;
      activate a motor speed governor responsive to an input received by the controller, wherein the motor speed governor is structured to control a vehicle speed; and
      adjust an output torque based on the vehicle speed being at or above the predetermined speed limit.

2. The system of claim 1, wherein the vehicle is a direct-drive electric vehicle or a hybrid vehicle.

3. The system of claim 1, wherein the motor speed governor is operable between a first speed and a second speed, and wherein the first speed comprises a speed rate of zero miles per hour and the second speed comprises a calibratable speed.

4. The system of claim 1, wherein the calibratable speed corresponds to a rate of speed between zero miles per hour and approximately 2.5 miles per hour.

5. The system of claim 1, wherein the adjustment of the output torque responsive to the input received by the controller comprises adjusting the output torque in proportion to a load on the motor.

6. The system of claim 1, wherein the output torque is increased responsive to an adjustment of the vehicle speed.

7. The system of claim 1, wherein the vehicle speed is adjusted based on an application of a brake mechanism.

8. The system of claim 7, wherein the brake mechanism is movable between a depressed state and a released state.

9. The system of claim 1, wherein the controller is further structured to deactivate the motor speed governor responsive to at least one of the vehicle speed having a rate of zero miles per hour or receiving an indication of the vehicle speed being below the predetermined speed limit.

10. The system of claim 1, wherein the input includes a transmission setting of a transmission of the vehicle.

11. A system comprising:
at least one processing circuit comprising a processor coupled to a memory device storing instructions therein that, when executed by the processor, cause the processing circuit to:
receive a speed of a vehicle that is at or above a predetermined speed limit;
receive an input;
activate a motor speed governor based on the input, wherein the motor speed governor is structured to control a vehicle speed; and
adjust, via the motor speed governor, an output torque based on the vehicle speed being at or above the predetermined speed limit.

12. The system of claim 11, wherein the motor speed governor is operable between a first speed and a second speed, and wherein the first speed comprises a speed rate of zero miles per hour and the second speed comprises a calibratable speed.

13. The system of claim 12, wherein the adjustment of the output torque based on the input comprises adjusting the output torque in proportion to a load on a motor.

14. The system of claim 11, wherein the instructions, when executed by the processor, further cause the processing circuit to deactivate the motor speed governor responsive to at least one of the vehicle speed comprising a speed rate of zero miles per hour or receiving an indication of a desired change in vehicle acceleration.

15. A method comprising:
determining, by a controller, that a vehicle speed of a vehicle is at or above a predetermined speed limit;
activating, by the controller, a motor speed governor responsive to an input received by the controller, wherein the motor speed governor is structured to control the vehicle speed; and
adjusting, by the controller via the motor speed governor, an output torque based on the vehicle speed being at or above the predetermined speed limit.

16. The method of claim 15, wherein the motor speed governor is operable between a first speed and a second speed, and wherein the first speed comprises a speed rate of zero miles per hour and the second speed comprises a calibratable speed.

17. The method of claim 15, further comprising deactivating, by the controller, the motor speed governor responsive to at least one of the vehicle speed comprising a speed rate of zero miles per hour or receiving an indication of the vehicle speed being below the predetermined speed limit.

18. The method of claim 16, further comprising monitoring, by the controller, the vehicle speed.

19. The method of claim 18, further comprising providing, by controller, an indication of a change in vehicle speed to the motor speed governor.

20. The method of claim 16, further comprising, reducing, by the controller, the vehicle speed by causing a motor to initiate a power generating state.

* * * * *